(12) United States Patent
Kim (10) Patent No.: US 11,685,361 B2
(45) Date of Patent: Jun. 27, 2023

(54) APPARATUS AND METHOD FOR CONTROLLING DRIVING MODE OF HYBRID ELECTRIC VEHICLE

(71) Applicants: Hyundai Motor Company, Seoul (KR); Kia Motors Corporation, Seoul (KR)

(72) Inventor: Suk Hyung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 170 days.

(21) Appl. No.: 16/540,785

(22) Filed: Aug. 14, 2019

(65) Prior Publication Data

US 2020/0282970 A1 Sep. 10, 2020

(30) Foreign Application Priority Data

Mar. 5, 2019 (KR) .......................... 10-2019-0025353

(51) Int. Cl.
*B60W 20/00* (2016.01)
*B60K 6/20* (2007.10)

(52) U.S. Cl.
CPC ............... *B60W 20/00* (2013.01); *B60K 6/20* (2013.01); *B60W 2510/242* (2013.01); *B60Y 2200/92* (2013.01)

(58) Field of Classification Search
CPC .................................................. B60W 20/00
See application file for complete search history.

(56) References Cited

U.S. PATENT DOCUMENTS

| | | | |
|---|---|---|---|
| 8,781,659 B2 | 7/2014 | Kim | |
| 9,293,937 B2 * | 3/2016 | Kawahara | ................. H02J 7/02 |
| 9,434,372 B2 * | 9/2016 | Iwasa | ................. F16H 61/0021 |
| 9,490,741 B2 * | 11/2016 | Matsui | ............... H01M 10/441 |
| 9,711,977 B2 * | 7/2017 | Kang | ....................... H04Q 9/00 |
| 10,106,166 B2 * | 10/2018 | Orita | ..................... B60W 30/20 |
| 10,112,617 B2 * | 10/2018 | Orita | ..................... B60W 30/19 |
| 10,224,731 B2 * | 3/2019 | Honkura | ............... H01M 10/48 |
| 10,232,715 B2 * | 3/2019 | Kawashima | .......... B60L 3/0069 |

(Continued)

FOREIGN PATENT DOCUMENTS

| | | | |
|---|---|---|---|
| FR | 2776139 | * | 3/1998 |
| KR | 101361384 B1 | | 2/2014 |
| WO | WO2010032995 A2 | * | 8/2008 |

OTHER PUBLICATIONS

Google Translation of WO2010032995A2.*

*Primary Examiner* — Jean Paul Cass
(74) *Attorney, Agent, or Firm* — Fox Rothschild LLP (57) ABSTRACT

An apparatus for controlling a driving mode of a hybrid vehicle and a method thereof are provided in which a specific cell, which constitutes a battery, is prevented from being overdischarged by adjusting a switching time point of a driving mode (an electric vehicle (EV) mode or a hybrid electric vehicle (HEV) mode) based on a cell voltage change of the battery mounted in the hybrid electric vehicle. The apparatus for controlling the driving mode of the hybrid vehicle includes a battery including a plurality of cells, a voltage sensor to measure voltages of the cells in the battery, and a controller to control a switching time point from the EV mode to the HEV mode based on the voltages of the cells in the battery, as measured by the voltage sensor.

14 Claims, 7 Drawing Sheets

(56) References Cited

U.S. PATENT DOCUMENTS

| | | | |
|---|---|---|---|
| 10,281,529 B2* | 5/2019 | Ma | G01R 31/389 |
| 10,377,368 B2* | 8/2019 | Miyaishi | B60W 20/00 |
| 10,457,290 B2* | 10/2019 | Miyaishi | B60W 10/02 |
| 10,627,451 B2* | 4/2020 | Karner | G01R 31/3835 |
| 10,680,453 B2* | 6/2020 | Sakabe | B60L 58/14 |
| 10,784,541 B2* | 9/2020 | Teng | H02J 7/00032 |
| 10,837,547 B2* | 11/2020 | Shimizu | B60K 6/543 |
| 10,840,722 B2* | 11/2020 | Ohkawa | H02J 7/00 |
| 10,916,813 B2* | 2/2021 | Cha | H01M 10/48 |
| 11,009,555 B2* | 5/2021 | Cha | G01R 31/389 |
| 2009/0212626 A1* | 8/2009 | Snyder | B60L 15/209 |
| | | | 903/930 |
| 2010/0140003 A1* | 6/2010 | Saha | B60L 15/08 |
| | | | 318/432 |
| 2011/0089905 A1* | 4/2011 | Yano | H01M 10/441 |
| | | | 320/132 |
| 2013/0166118 A1 | 6/2013 | Kim | |
| 2013/0218389 A1* | 8/2013 | Tanishima | B60W 10/08 |
| | | | 180/65.265 |
| 2013/0218391 A1* | 8/2013 | Aizawa | B60W 10/08 |
| | | | 903/930 |
| 2014/0111164 A1* | 4/2014 | Ohkawa | H02J 7/04 |
| | | | 320/134 |
| 2015/0006000 A1* | 1/2015 | Kawata | B60W 20/30 |
| | | | 180/65.265 |
| 2015/0066262 A1* | 3/2015 | Chang | B60L 58/21 |
| | | | 701/22 |
| 2015/0298546 A1* | 10/2015 | Maruyama | B60W 20/20 |
| | | | 903/930 |
| 2016/0052505 A1* | 2/2016 | Zhou | B60W 20/10 |
| | | | 903/930 |
| 2016/0185340 A1* | 6/2016 | Yoshida | B60K 6/48 |
| | | | 180/65.265 |
| 2018/0079317 A1* | 3/2018 | Yoshida | H01M 10/44 |

\* cited by examiner

APPARATUS AND METHOD FOR CONTROLLING DRIVING MODE OF HYBRID ELECTRIC VEHICLE

CROSS-REFERENCE TO RELATED APPLICATION

This application claims under 35 U.S.C. § 119(a) the benefit of Korean Patent Application No. 10-2019-0025353, filed in the Korean Intellectual Property Office on Mar. 5, 2019, the entire contents of which are incorporated herein by reference.

BACKGROUND

(a) Technical Field

The present disclosure relates to an apparatus and method for controlling a driving mode of a hybrid electric vehicle (HEV), more particularly, to the apparatus and method capable of adjusting a switching time point of the driving mode (i.e., an electric vehicle (EV) mode or a hybrid electric vehicle (HEV) mode) based on a cell voltage change of a battery (high-voltage battery) mounted in the HEV.

(b) Description of the Related Art

In general, a hybrid electric vehicle (HEV) is a vehicle that combines two types of power sources, such an engine and an electric motor. Typically, the HEV refers to a vehicle which utilizes the engine, which obtains driving force by combusting fuel (fossil fuel such as gasoline), and the electric motor driven with power of a battery.

The HEV may have various structures by employing the engine and the electric motor as power sources. One type of HEV, which directly transfers mechanical power of the engine to the wheel and is assisted by an electric motor driven with power of the battery if necessary, is referred to as a parallel hybrid electric vehicle. Another type of HEV, which changes the mechanical power of the engine to electric power through a power generator to drive the electric motor or charge the battery, is referred to as a series-hybrid electric vehicle. In general, the parallel hybrid electric vehicle is advantageous for high-speed driving or long-distance driving, and the series-hybrid electric vehicle is advantageous for downtown driving or short-distance driving.

In addition, a plug-in hybrid electric vehicle (PHEV) has been developed such that the capacity of a battery typically is larger than that of an existing HEV, and the battery is charged from an external power source. Accordingly, the plug-in vehicle runs only in an EV mode in short-distance driving and runs in the HEV mode when the battery is discharged. In other words, as the PHEV is equipped with both an engine driven by gasoline and a motor driven by the battery, similar to existing HEVs, the PHEV is driven by using one or both of the engine and the motor. However, the PHEV vehicle is equipped with a high-voltage battery having a larger capacity to be charged with external electricity.

When power required by the driver is larger than the maximum output power of a motor and a battery or when the State Of Charge (SOC) of the battery is equal to or less than a reference value (for example, 15%), the PHEV runs in HEV mode by driving the engine. To the contrary, when the required power by the driver is within the output power range of the motor and the battery, and the battery is charged from an external power source before the battery is discharged, the PHEV may run in EV mode without driving the engine.

A battery power supply device inside the HEV employs a multi-cell battery. A higher voltage may be applied or the capacity may be increased by using a battery having multiple cells instead of a battery having a single cell. However, since each cell has an intrinsic charging/discharging characteristic, each cell voltage may be unbalanced with the passage of time.

This unbalancing of the battery cell causes overdischarge of a specific cell, which leads to output limitations of the HEV. Accordingly, the acceleration required by the driver may be not provided, and a smooth gear shift feeling may be not provided to the driver. Accordingly, a cell balancing procedure needs to be performed for the balancing of each cell such that the overdischarge of a specific cell is prevented and all cells are uniformly charged.

A Battery Management System (BMS) mounted on a hybrid electric vehicle measures battery voltage/current/temperature of an HEV to calculate battery SOC and power, which may be output in real time by measuring battery voltage/current/temperature of a hybrid electric vehicle. In particular, each cell voltage of the battery having an in-series connection may be measured, and an inter-cell balancing procedure is performed based on the measured voltage value.

However, such an inter-cell balancing procedure may be performed only in a state in which preparation for driving of the HEV is completed (i.e., the HEV is stopped). In addition, it may take one week or more until the cell balancing procedure is completed. Accordingly, the overdischarge of a specific cell, which is caused due to a voltage difference between cells constituting the battery in the EV mode, may be not prevented.

SUMMARY

An aspect of the present disclosure provides an apparatus and a method for controlling a driving mode of a hybrid electric vehicle, capable of preventing a specific cell, which constitutes a battery, from being overdischarged by adjusting a switching time point of a driving mode (an electric vehicle (EV) mode or a hybrid electric vehicle (HEV) mode) based on cell voltage change of a battery (high-voltage battery) mounted in a hybrid electric vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a driving mode of a hybrid vehicle includes a battery including a plurality of cells, a voltage sensor to measure voltages of the cells in the battery, and a controller to control a switching time point from an electric vehicle (EV) mode to a hybrid electric vehicle (HEV) mode based on the voltages of the cells in the battery, as measured by the voltage sensor.

In this case, the controller may increase a threshold value serving as a reference for switching from the EV mode to the HEV mode when a difference between a maximum value and a minimum value of voltages of cells in the battery, which are measured by the voltage sensor, exceeds a reference value. In this case, the controller may increase the threshold value by a fixed value and may vary the threshold value depending on a degree that the difference between the maximum value and the minimum value of the voltages of the cells in the battery, which are measured by the voltage sensor, exceeds the reference value.

In addition, the controller may return the threshold value when the difference between the maximum value and the minimum value of the voltages of the cells in the battery, which are measured by the voltage sensor, does not exceed the reference value, after the threshold value is increased.

According to the present disclosure, the apparatus may further include a storage device configured to store the threshold value.

In addition, the controller may arrange the voltages of the cells in the battery, which are measured by the voltage sensor, based on intensities of the voltages, may divide the voltages of the cells into an upper group, an intermediate group, and a lower group, and may increase a threshold value serving as a reference for switching from the EV mode to the HEV mode when a difference between an average voltage of the upper group and an average voltage of the lower group exceeds a reference value. In this case, the controller may increase the threshold value by a fixed value, and may vary the threshold value depending on a degree that the difference between the average voltage of the upper group and the average voltage of the lower group exceeds the reference value.

In addition, the controller may return the threshold value when the difference between the average voltage of the upper group and the average voltage of the lower group does not exceed the reference value after the threshold value is increased.

According to an aspect of the present disclosure, a method for controlling a driving mode of a hybrid vehicle may include measuring, by a voltage sensor, voltages of cells in a battery, and adjusting, by a controller, a switching time point from an EV mode to a HEV mode based on the measured voltages of the cells in the battery.

In this case, the adjusting of the switching time point from the EV mode to the HEV mode may include increasing a threshold value serving as a reference for switching from the EV mode to the HEV mode when a difference between a maximum value and a minimum value of the measured voltages of the cells in the battery exceeds a reference value. In this case, the threshold value may be increased by a fixed value, and the threshold value may be varied depending on a degree that the difference between the maximum value and the minimum value of the measured voltages of the cells in the battery exceeds the reference value.

In addition, the adjusting of the switching time point from the EV mode to the HEV mode may include returning the threshold value when the difference between the maximum value and the minimum value of the voltages of the cells in the battery, which are measured by the voltage sensor, does not exceed the reference value, after the threshold value is increased.

According to the present disclosure, the method may further include storing the threshold value.

In addition, the adjusting of the switching time point from the EV mode to the HEV mode may include arranging the voltages of the cells in the battery, which are measured by the voltage sensor, based on intensities of the voltages and then dividing the voltages of the cells into an upper group, an intermediate group, and a lower group, and increasing a threshold value serving as a reference for switching from the EV mode to the HEV mode when a difference between an average voltage of the upper group and an average voltage of the lower group exceeds a reference value. In this case, the threshold value may be increased by a fixed value, and may be varied depending on a degree that the difference between the average voltage of the upper group and the average voltage of the lower group exceeds the reference value.

In addition, the adjusting of the switching time point from the EV mode to the HEV mode may further include returning the threshold value when the difference between the average voltage of the upper group and the average voltage of the lower group does not exceed the reference value after the threshold value is increased.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Figure 1:
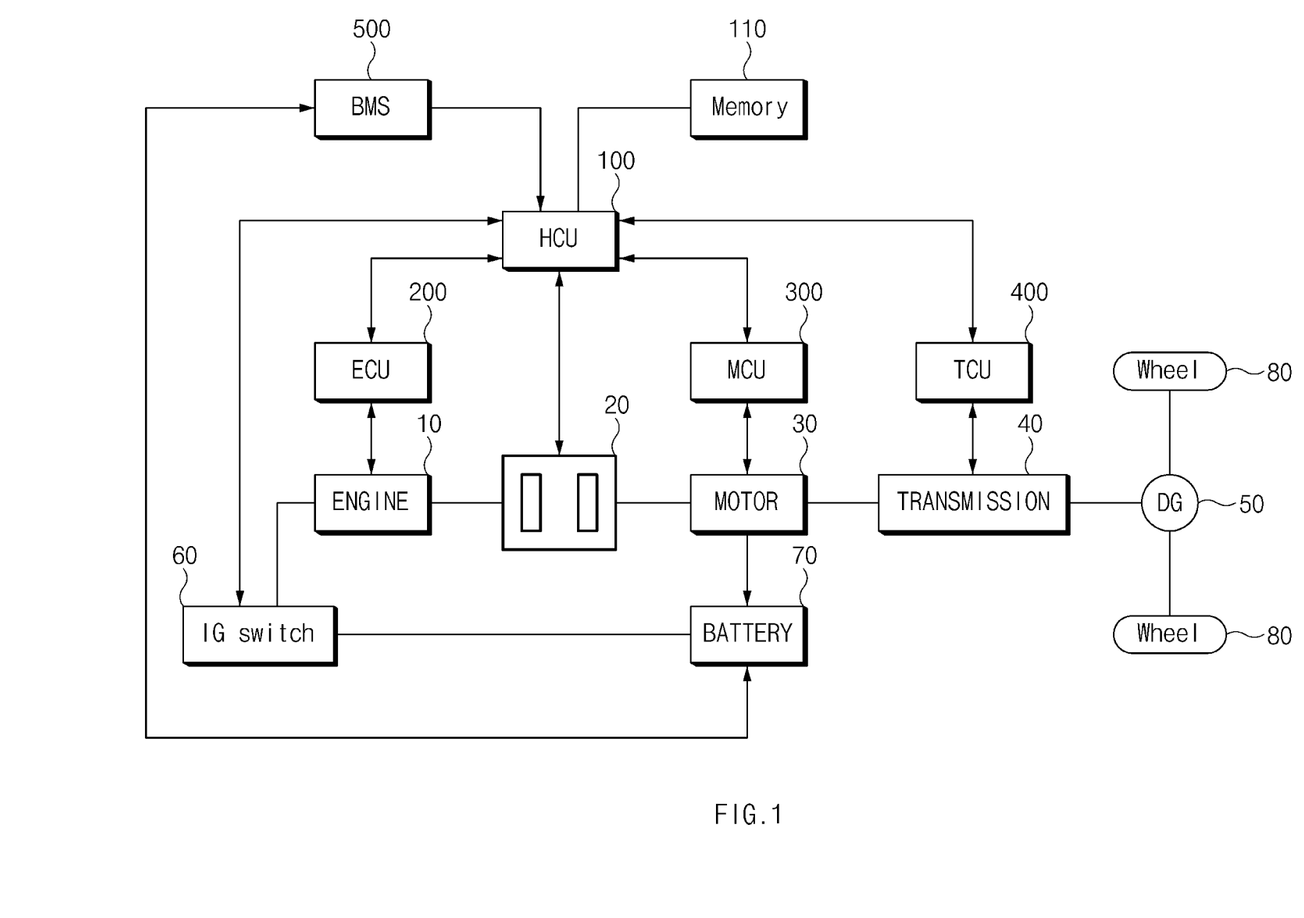
FIG. 1 is a schematic view illustrating an HEV to which the present disclosure is applied.

FIG. 1 is a schematic view illustrating a hybrid electric vehicle to which the present disclosure is applied.

As illustrated in FIG. 1, a hybrid electric vehicle to which the present disclosure is applied may include an engine 10, an engine clutch 20, a motor 30, a transmission 40, a differential gear 50, an ignition switch 60, a battery 70, a vehicle wheel 80, a hybrid control unit (HCU) 100, a non-volatile memory 110, an engine control unit (ECU) 200, a motor control unit (MCU) 300, a transmission control unit (TCU) 400, and a BMS 500.

The engine clutch 20 controls the power between the engine 10 and the motor 30, and the ignition switch 60 starts the engine 10 or the motor 30 through the battery 70 connected to the motor 30. In addition, the battery 70 supplies a voltage to the motor 30 in an EV mode.

The ECU 200 controls the overall operation of the engine 10, the MCU 300 controls the overall operation of the motor 30, and the TCU 400 controls the overall operation of the transmission 40. In other words, the ECU 200 controls the operation of the engine 10 in response to a control signal applied from the HCU 100 via a network.

The MCU 300 converts the DC voltage of the battery 70 into a three-phase AC voltage in response to a control signal provided to the network from the HCU 100, and controls the output torque and the speed of the motor 30 based on a required output.

The MCU 300 cranks the engine through the motor 30 to start the engine in response to the control of the HCU 100.

The MCU 300 includes an inverter including a plurality of power switching elements, and the power switching element may include any one of an Insulated Gate Bipolar Transistor (IGBT), a MOSFET, and a transistor.

The BMS 500 manages the SOC by detecting the current, the voltage, or the temperature of each cell within an operating region of the battery 79, provides information on the battery 70 to the HCU 100 through the network, and controls the charging/discharging the voltage of the battery 70. In particular, the BMS 500 can prevent the lifespan of the battery 70 from being reduced as the voltage of the battery 70 is over-discharged to be equal to or less than a limit voltage or overcharged to be equal to or greater than another limit voltage.

The BMS 500 measures each cell voltage of the battery and performs an inter-cell balancing process based on the measured voltage value.

The HCU 100, which is an upper-level controller to control the overall operation of the hybrid electric vehicle, and is connected with various controllers through the network to mutually transmit/receive information. In addition, the HCU 100 performs cooperation control to control the output torque of the engine 10 and the motor 30 and to control a target gear ratio while maintaining running. In this case, the non-volatile memory 110 is a recording medium which preserves stored data even if the power is turned off and allows a user to erase and input the content of data. The non-volatile memory 110 may be installed inside or outside the HCU 100. The non-volatile memory 110 may include a flash memory, or an electrically erasable programmable read only memory (EEPROM), for example.

In addition, the HCU 100 may perform switching between the EV mode and the HEV mode of the hybrid electric vehicle. In this case, the EV mode refers to a mode in which a vehicle runs with the power of the motor, and the HEV mode refers to a mode in which a vehicle runs with the power of the engine.

Figure 2A:
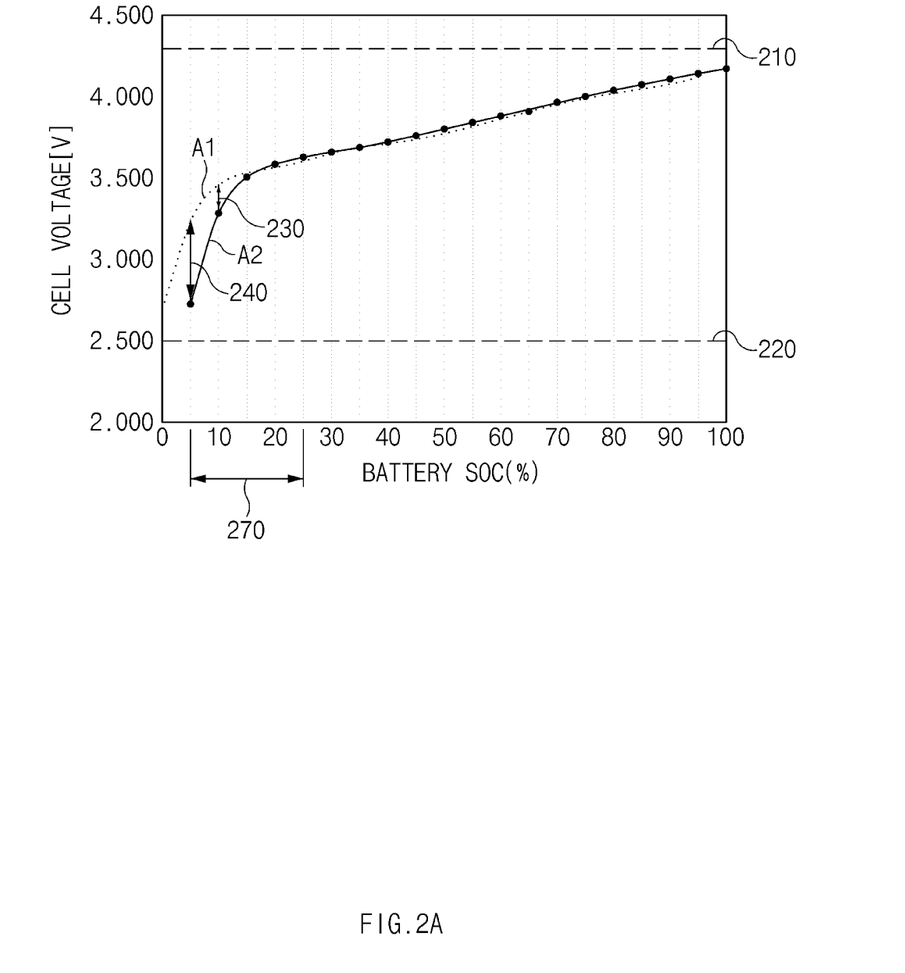
FIGS. 2A and 2B are graphs illustrating the principle that the apparatus for controlling the driving mode of the HEV prevents a specific cell from being overdischarged, according to an embodiment of the present disclosure.
Figure 2B:
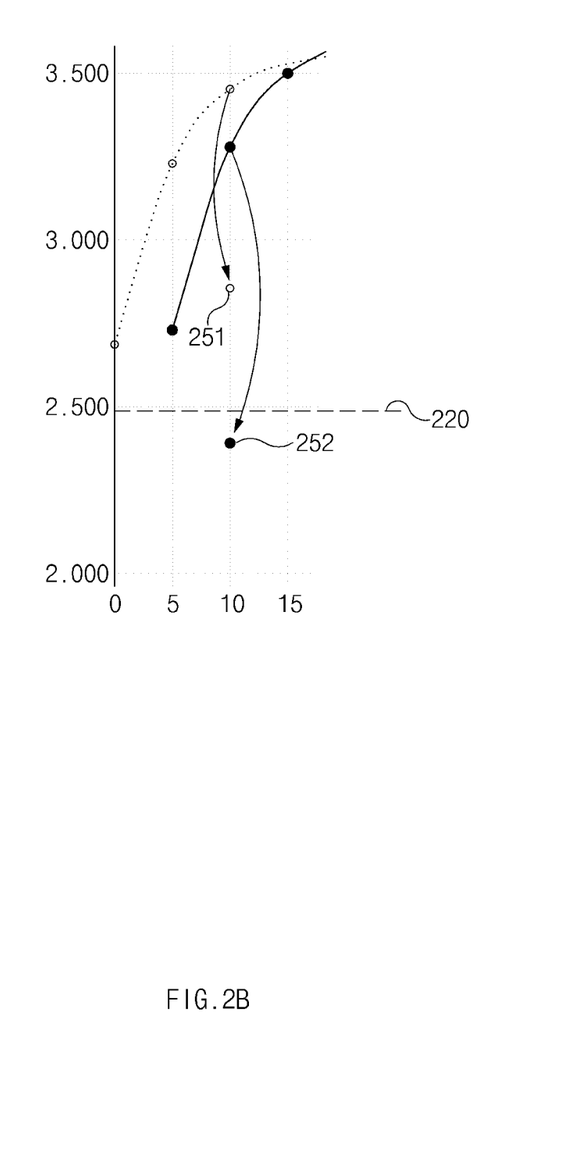

FIGS. 2A and 2B are graphs illustrating the principle that the apparatus for controlling the driving mode of the HEV prevents a specific cell from being overdischarged, according to an embodiment of the present disclosure.

FIG. 2A illustrates a cell voltage in a non-load state. In FIG. 2A, reference numeral '210' represents an upper limit voltage of the battery cell, reference numeral '220' represents a lower limit voltage of the battery cell, reference sign 'A1' represents a first cell having a maximum voltage in a specific SOC section 270, and reference sign 'A2' represents a second cell having a minimum voltage in the specific SOC section 270.

It may be recognized from FIG. 2A that the first cell A1 and the second cell A2 have mutually different voltages due to their intrinsic characteristics. In addition, it may be recognized that the differential voltage between the first cell A1 and the second cell A2 in 5% of the SOC is greater than the differential voltage between the first cell A1 and the second cell A2 in 10% of the SOC. In other words, as the SOC of the battery is lowered, the differential voltage between the first cell A1 and the second cell A2 is increased.

FIG. 2B illustrates a drop degree of a cell voltage when a load is connected with the battery. As illustrated in FIG. 2B, when the SOC of the battery is 10%, the voltage of the first cell A1 is not dropped under the lower limit voltage 220, but the voltage of the second cell A2 is dropped under the lower limit voltage 200 to be overdischarged.

The overdischarge of the specific cell causes the degradation of the function of the cell, and serves as a cause of restricting the output in the hybrid electric vehicle, so the acceleration desired by a driver is not provided. In addition, a smooth gear shift feeling is not provided to the driver.

According to an embodiment of the present disclosure, the apparatus for controlling the driving mode of the hybrid electric vehicle controls the switching time point of the driving modes (an EV mode and an HEV mode) based on the above problem.

Figure 3:
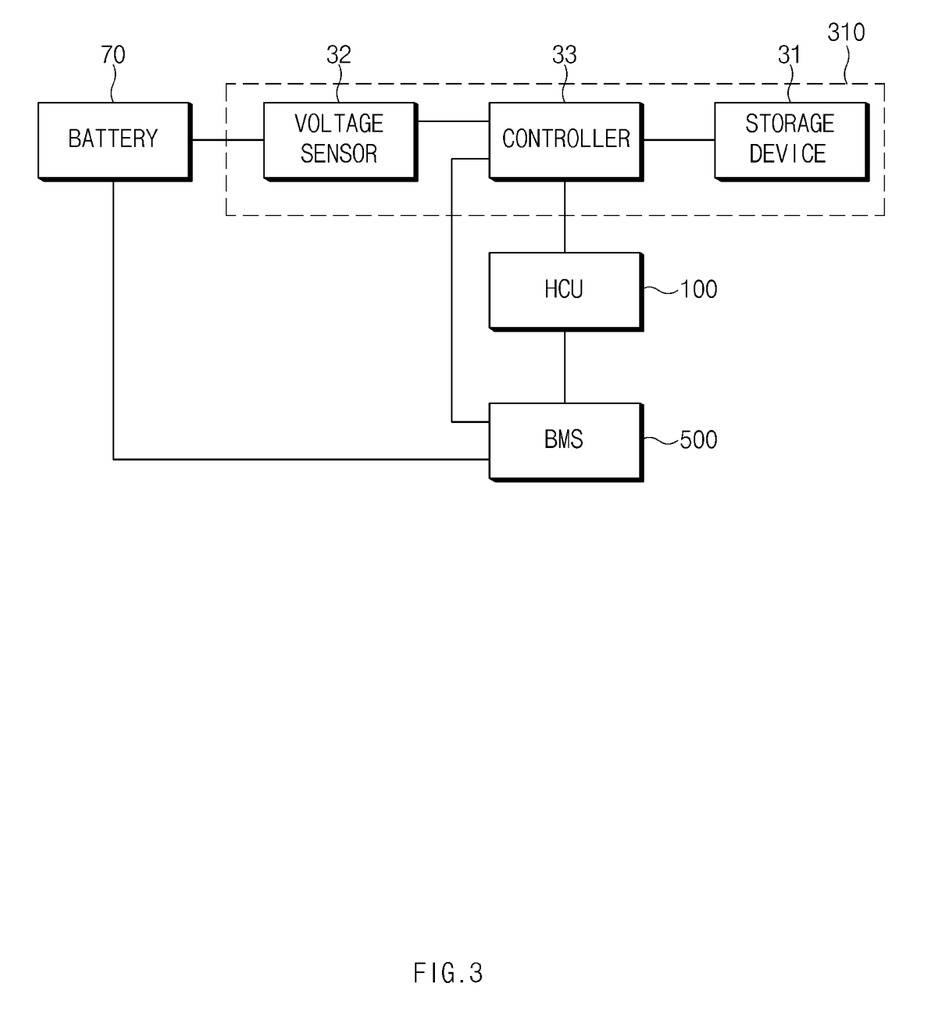
FIG. 3 is a block diagram illustrating the apparatus for controlling the driving mode of the hybrid electric vehicle, according to an embodiment of the present disclosure.

FIG. 3 is a block diagram illustrating the configuration of the apparatus for controlling the driving mode of the hybrid electric vehicle, according to an embodiment of the present disclosure. The apparatus may be implemented separately from the HCU 100 or be implemented to be provided inside the HCU 100.

As illustrated in FIG. 3, according to an embodiment of the present disclosure, the apparatus 310 for controlling the driving mode of the hybrid electric vehicle includes a storage device 31, a voltage sensor 32, and a controller 33. Meanwhile, depending on a scheme of reproducing the apparatus for controlling the driving mode of the hybrid electric vehicle, components are coupled to each other to be unified in one component. In addition, some components may be omitted depending on the scheme of reproducing the present disclosure.

Regarding each component, the storage device 31 may store various logic, algorithms, and programs required to adjust the switching time point of the driving modes (EV mode and HEV mode) based on the cell voltage change of the battery 70 provided in the hybrid electric vehicle.

In addition, the storage device 31 may store an SOC value (hereinafter, referred to as a "first threshold value") of the battery, which serves as the reference value for the switching from the EV mode to the HEV mode when the voltage difference between a first cell A1, which has the maximum voltage, and a second cell A2, which has the minimum voltage, among cells of the battery 70 does not exceed the reference value, and an SOC value (hereinafter, referred to as a "second threshold") of the battery, which serves as the reference for switching from the EV mode to the HEV mode, when the voltage difference between the first cell (A1), which has the maximum voltage, and the second cell (A2), which has the minimum voltage, among the cells of the battery 70 exceeds the reference value In addition, the storage device 31 may be implemented with at least one storage medium of a flash type memory, a hard disk type memory, a micro type memory, a card type memory (e.g., a Security Digital (SD) card or an eXtreme digital card), a Random Access Memory (RAM), a Static Random Access Memory (SRAM), a Read Only Memory (ROM), a Programmable Read Only Memory (PROM), an Electrically Erasable and Programmable ROM (EEPROM), a magnetic RAM (MRAM), a magnetic disk, and an optical disk-type memory.

The voltage sensor 32 measures the voltage of each cell constituting the battery 70. Although an example that the voltage sensor 32 is separately implemented has been described in the present disclosure, a voltage sensor (not illustrated) implemented in the BMS 500 may be used.

Hereinafter, the structure of the voltage sensor 32 will be described in detail with reference to FIG. 4.

Figure 4:
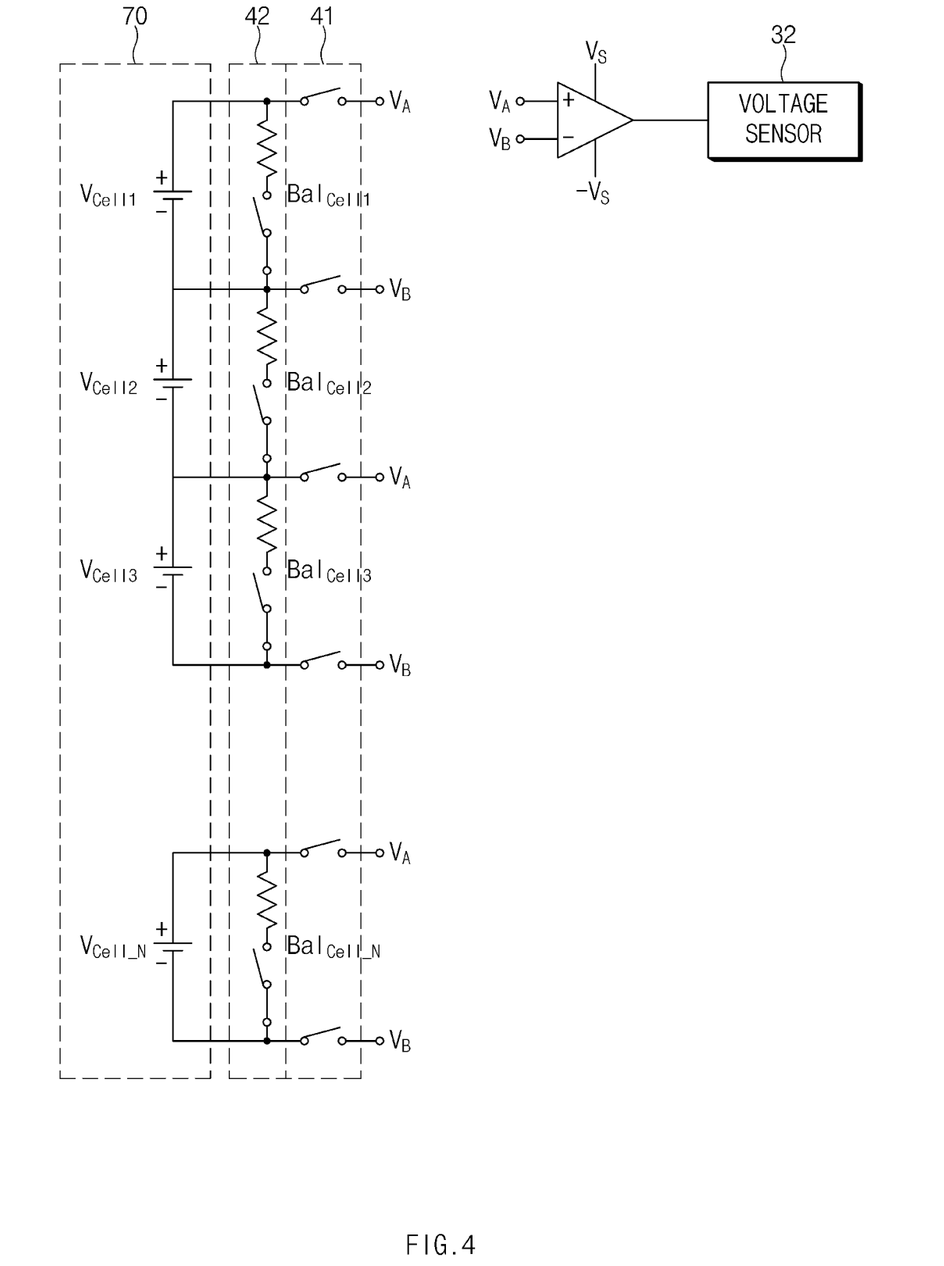
FIG. 4 is a view illustrating the structure of the voltage sensor, according to an embodiment of the present disclosure.

FIG. 4 is a view illustrating the structure of the voltage sensor, according to an embodiment of the present disclosure.

In FIG. 4, reference numeral '70' represents a battery including a plurality of cells, and reference numeral '41' represents a relay for measuring a voltage. Reference numeral '42' represents a relay for cell balancing.

The voltage sensor 32 measures the voltage of each cell of the battery 70 using the relay 42 for measuring the voltage. In this case, the cell 42 for the cell balancing is used for cell balancing of the battery 70.

Next, the controller 33 performs the overall control such that the components normally perform the intrinsic functions of the components. In addition, the controller 33 may be implemented in the form of hardware or software, and may be present in the form of the combination of the hardware and the software. Preferably, the controller 33 may be implemented in the form of a micro-processor, but the present disclosure is not limited thereto.

In addition, the controller 33 performs various control operations required in the process of adjusting the switching time point of the driving mode (EV mode and HEV mode) based on the cell voltage difference of the battery 70 provided in the hybrid electric vehicle.

In addition, the controller 33 may perform a control operation in the process that the storage device 31 may store an SOC value (hereinafter, referred to as a "first threshold value") of the battery, which serves as the reference for switching from the EV mode to the HEV mode when the voltage difference between a first cell A1, which has the maximum voltage, and a second cell A2, which has the minimum voltage, among cells of the battery 70 does not exceed the reference value, and an SOC value (hereinafter, referred to as a "second threshold") of the battery, which serves as the reference for switching from the EV mode to the HEV mode, when the voltage difference between the first cell (A1), which has the maximum voltage, and the second cell (A2), which has the minimum voltage, among the cells of the battery 70 exceeds the reference value.

In addition, the controller 33 performs a control operation required in the process that the voltage sensor 32 measures the voltage of each of cells constituting the battery 70.

Further, the controller 33 adjusts the switching time point from the EV mode to the HEV mode based on the voltages of the cells in the battery 70, the voltages being measured by the voltage sensor 32.

In addition, the controller 33 increases an SOC value (threshold value) of the battery, which serves as a reference for switching from the EV mode to the HEV mode when the difference between the maximum value and the minimum value of the voltages of the cells in the battery 70, as measured by the voltage sensor 32, exceeds the reference value. In other words, the controller 33 changes from a first threshold (e.g., 15%) to a second threshold (e.g., 15%+α%). In this case, the α value (increment) may be a fixed value or may be variable depending on the extent (an excess) that the difference between the maximum value and the minimum value of the voltages of the cells in the battery 70 exceeds the reference value. For example, the following Table 1 is shown.

TABLE 1

| An excess (V) | An increment (α) |
|---|---|
| 0.1 or more and less than 0.5 | 3% |
| 0.5 or more and less than 1 | 5% |
| 1 or more | 7% |

Accordingly, the switching time point from the EV mode to the HEV mode comes earlier, thereby preventing the cell, which has the minimum voltage, in cells of the battery 70 from being overdischarged.

In addition, the controller 33 may return from the second threshold value to the first threshold value when the cell balancing procedure performed for a longer time is completed by the BMS 500, so the difference between the maximum value and the minimum value of cell voltages of the battery 70, which are measured by the voltage sensor 32, does not exceed the reference value.

According to another embodiment, the controller 33 arranges cell voltages of the battery 70, which are measured by the voltage sensor 32, based on the intensities of the cell voltages. The cell voltages are grouped into an upper group, an intermediate group, and a lower group. When the difference between the average voltage of the upper group and the average voltage of the lower group exceeds the reference value, the controller 33 may increase the SOC value of the battery, which serves as the reference for switching from the EV mode to the HEV mode.

For example, when the battery 70 includes 96 cells, and when the cells are arranged from cell #1 having the maximum value to cell #96 having the minimum value based on the voltage intensities of the cells, the upper group may include cell #1 to cell #3, the intermediate group may include cell #4 to cell #93, and the lower group may include cell #94 to cell #96. In this case, it is preferred that the number of cells included in each of the upper group and the lower group does not exceed five.

Figure 5:
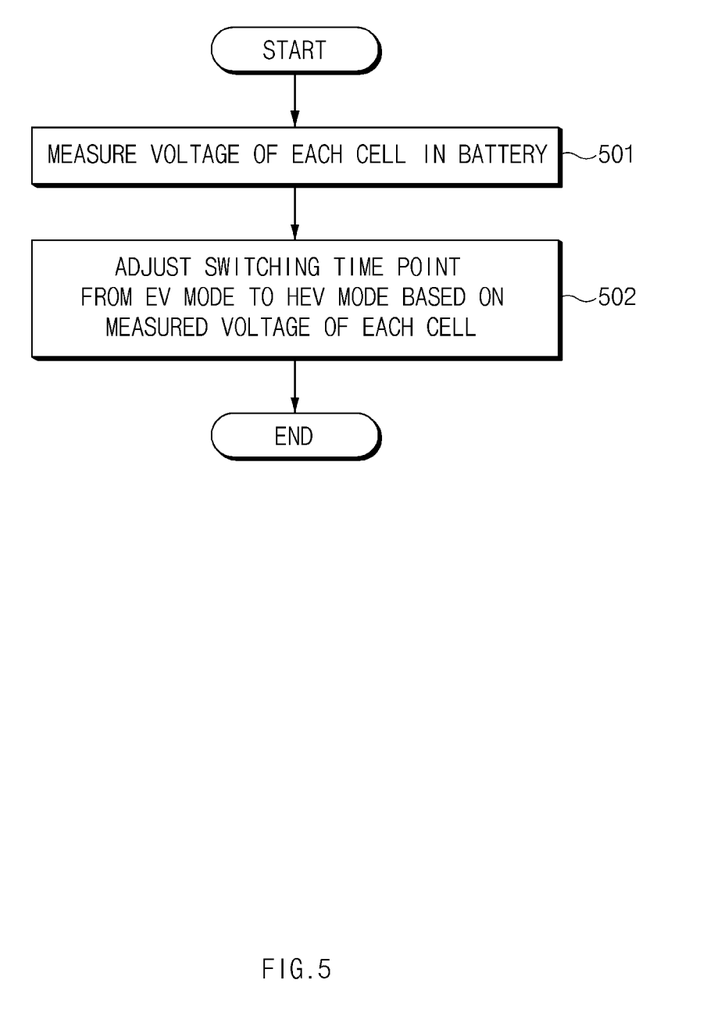
FIG. 5 is a flowchart illustrating the method for controlling the driving mode of the hybrid electric vehicle, according to an embodiment of the present disclosure.

FIG. 5 is a flowchart illustrating the method for controlling the driving mode of the hybrid electric vehicle, according to an embodiment of the present disclosure.

The voltage sensor 32 measures voltages of cells in the battery 70 (501).

Thereafter, the controller 33 adjusts the switching time point from the EV mode to the HEV mode based on the voltage of each cell in the battery 70, as measured by the voltage sensor 32.

Figure 6:
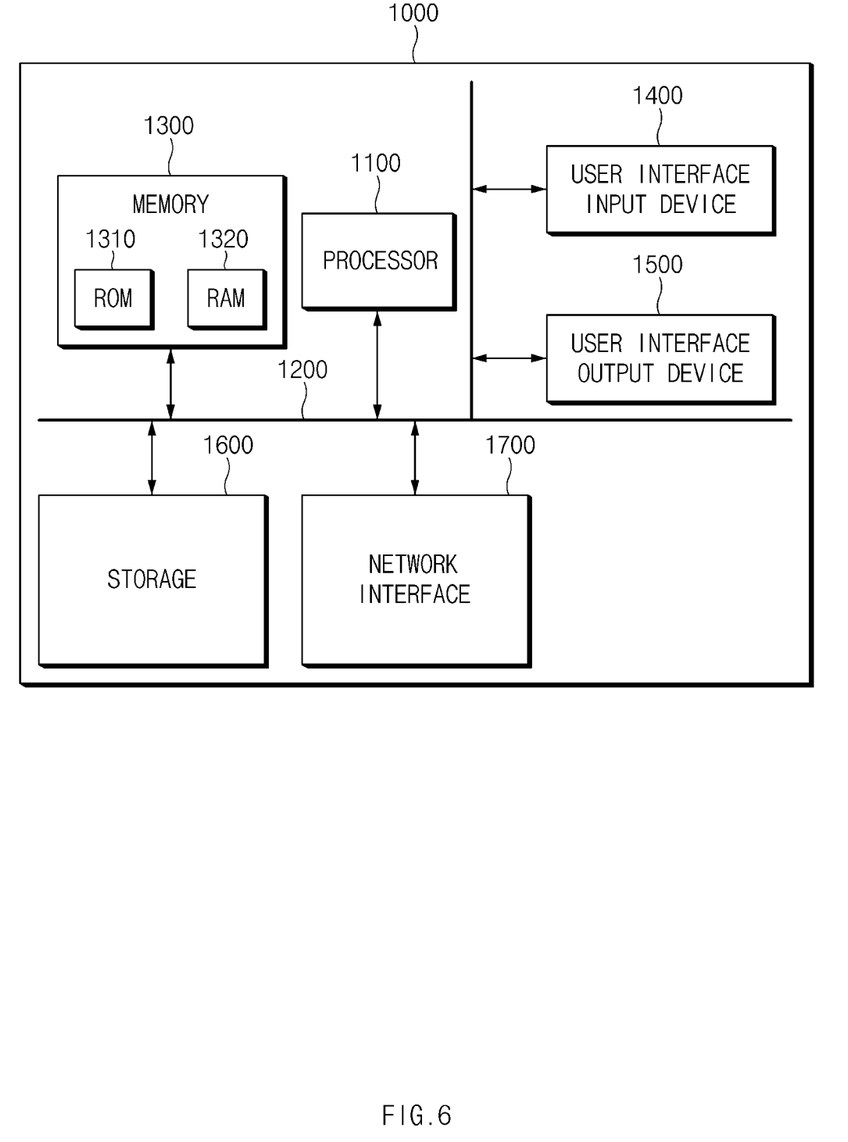
FIG. 6 is a block diagram illustrating a computing system to execute the method for controlling the driving mode of the HEV, according to an embodiment of the present disclosure.

FIG. 6 is a block diagram illustrating a computing system to execute the method for controlling the driving mode of the HEV, according to an embodiment of the present disclosure.

Referring to FIG. 6, the method for controlling the driving mode of the hybrid electric vehicle according to an embodiment of the present disclosure may be implemented through the computing system. A computing system 1000 may include at least one processor 1100, a memory 1300, a user interface input device 1400, a user interface output device 1500, a storage device 1600, and a network interface 1700, which are connected with each other via a system bus 1200.

The processor 1100 may be a central processing unit (CPU) or a semiconductor device for processing instructions stored in the memory 1300 and/or the storage device 1600. Each of the memory 1300 and the storage device 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage device 1600), such as a RAM, a flash memory, a ROM, an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, a specific cell, which constitutes a battery (high-voltage battery), may be prevented from being overdischarged by adjusting a switching time point of a driving mode (an electric vehicle (EV) mode or a hybrid electric vehicle (HEV) mode) based on cell voltage change of the battery (high-voltage battery) mounted in a hybrid electric vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope.

What is claimed is:

1. An apparatus for controlling a driving mode of a hybrid vehicle, the apparatus comprising:
    a battery including a plurality of cells;
    a voltage sensor configured to measure voltages of each of the cells in the battery; and
    a controller configured to control a switching time point from an electric vehicle (EV) mode to a hybrid electric vehicle (HEV) mode based on the voltages of each of the cells in the battery, as measured by the voltage sensor,
    wherein the controller increases a threshold value serving as a reference for switching from the EV mode to the HEV mode when a difference between a maximum value and a minimum value of voltages of each of the cells in the battery, which are measured by the voltage sensor, exceeds a reference value, and
    wherein the controller returns the threshold value when the difference between the maximum value and the minimum value of the voltages of each of the cells in the battery, which are measured by the voltage sensor, does not exceed the reference value, after the threshold value is increased, or
    wherein the controller arranges the voltages of each of the cells in the battery, which are measured by the voltage sensor, based on intensities of the voltages, divides the voltages of the cells into an upper group, an intermediate group, and a lower group, and increases the threshold value serving as the reference for switching from the EV mode to the HEV mode when the difference between an average voltage of the upper group and an average voltage of the lower group exceeds the reference value.

2. The apparatus of claim 1, wherein the controller increases the threshold value by a fixed value.

3. The apparatus of claim 1, wherein the controller varies the threshold value depending on a degree that the difference between the maximum value and the minimum value of the voltages of each of the cells in the battery, which are measured by the voltage sensor, exceeds the reference value.

4. The apparatus of claim 1, further comprising:
a storage device configured to store the threshold value.

5. The apparatus of claim 1, wherein the controller increases the threshold value by a fixed value.

6. The apparatus of claim 1, wherein the controller varies the threshold value depending on a degree that the difference between the average voltage of the upper group and the average voltage of the lower group exceeds the reference value.

7. The apparatus of claim 1, wherein the controller returns the threshold value when the difference between the average voltage of the upper group and the average voltage of the lower group does not exceed the reference value after the threshold value is increased.

8. A method for controlling a driving mode of a hybrid vehicle, the method comprising:
measuring, by a voltage sensor, voltages of each of a plurality cells in a battery; and
adjusting, by a controller, a switching time point from an EV mode to a HEV mode based on the measured voltages of each of the cells in the battery,
wherein the adjusting of the switching time point from the EV mode to the HEV mode includes:
increasing a threshold value serving as a reference for switching from the EV mode to the HEV mode when a difference between a maximum value and a minimum value of the measured voltages of each of the cells in the battery exceeds a reference value, and
returning the threshold value when the difference between the maximum value and the minimum value of the voltages of each of the cells in the battery, which are measured by the voltage sensor, does not exceed the reference value, after the threshold value is increased, or
arranging the voltages of each of the cells in the battery, which are measured by the voltage sensor, based on intensities of the voltages and then dividing the voltages of the cells into an upper group, an intermediate group, and a lower group; and
increasing the threshold value serving as the reference for switching from the EV mode to the HEV mode when the difference between an average voltage of the upper group and an average voltage of the lower group exceeds the reference value.

9. The method of claim 8, wherein the threshold value is increased by a fixed value.

10. The method of claim 8, wherein the threshold value is varied depending on a degree that the difference between the maximum value and the minimum value of the measured voltages of each of the cells in the battery exceeds the reference value.

11. The method of claim 8, further comprising:
storing the threshold value.

12. The method of claim 8, wherein the threshold value is increased by a fixed value.

13. The method of claim 8, wherein the threshold value is varied depending on a degree that the difference between the average voltage of the upper group and the average voltage of the lower group exceeds the reference value.

14. The method of claim 8, wherein the adjusting of the switching time point from the EV mode to the HEV mode further includes:
returning the threshold value when the difference between the average voltage of the upper group and the average voltage of the lower group does not exceed the reference value after the threshold value is increased.

* * * * *